United States Patent
Oberlaender

[11] Patent Number: 6,160,997
[45] Date of Patent: Dec. 12, 2000

[54] RADIO RECEIVER

[75] Inventor: Ralf Oberlaender, Hildesheim, Germany

[73] Assignee: Robert Bosch GmbH, Stuttgart, Germany

[21] Appl. No.: 08/878,414

[22] Filed: Jun. 18, 1997

[30] Foreign Application Priority Data

Jun. 21, 1996 [DE] Germany .......................... 196 24 635

[51] Int. Cl.[7] .............................. H04B 7/00; H04B 1/38; H04B 1/00

[52] U.S. Cl. ........................... 455/66; 455/550; 455/556; 379/110.01

[58] Field of Search ............................. 455/66, 344, 345, 455/346, 130, 550, 556, 558, 575, 564, 565; 379/110.01, 447, 428, 419

[56] References Cited

U.S. PATENT DOCUMENTS

| | | | |
|---|---|---|---|
| D. 260,770 | 9/1981 | Fukushima et al. | D14/68 |
| 4,481,382 | 11/1984 | Villa-Real | 455/556 |
| 4,670,747 | 6/1987 | Borras et al. | |
| 4,723,265 | 2/1988 | Kamei et al. | 455/564 |
| 4,736,410 | 4/1988 | Nishida et al. | 455/564 |
| 4,885,580 | 12/1989 | Noto et al. | 341/23 |
| 4,896,370 | 1/1990 | Kasparian et al. | 455/347 |
| 4,980,910 | 12/1990 | Oba et al. | 379/355 |
| 5,134,717 | 7/1992 | Rasmussen et al. | |
| 5,239,700 | 8/1993 | Guenther et al. | 455/158.4 |
| 5,243,640 | 9/1993 | Hadley et al. | 455/426 |
| 5,303,288 | 4/1994 | Duffy et al. | 455/564 |
| 5,305,014 | 4/1994 | Mutschler et al. | 345/173 |
| 5,305,372 | 4/1994 | Tomiyori | 455/564 |
| 5,319,803 | 6/1994 | Allen | 455/566 |
| 5,384,825 | 1/1995 | Dillard et al. | 455/566 |
| 5,418,836 | 5/1995 | Yazaki | 455/569 |
| 5,515,345 | 5/1996 | Barreira et al. | 369/6 |
| 5,537,673 | 7/1996 | Nagashima et al. | 455/346 |
| 5,553,117 | 9/1996 | Peterson et al. | 455/426 |
| 5,568,546 | 10/1996 | Marutiak | 379/355 |
| 5,581,593 | 12/1996 | Engelke et al. | 379/52 |
| 5,628,055 | 5/1997 | Stein | 455/575 |
| 5,722,088 | 2/1998 | Storn et al. | 455/564 |
| 5,724,663 | 3/1998 | Lee | 455/557 |
| 5,781,850 | 7/1998 | Ugge' et al. | 455/149 |
| 5,835,852 | 11/1998 | Bundgardt | 455/90 |
| 5,901,365 | 5/1999 | Yasuda et al. | 455/564 |
| 5,905,947 | 5/1999 | Stein | 455/90 |
| 5,963,875 | 10/1999 | Go | 455/564 |
| 5,978,689 | 11/1999 | Tuoriniemi et al. | 455/569 |
| 5,991,637 | 11/1999 | Mack, II et al. | 455/550 |
| 6,002,558 | 12/1999 | Rines et al. | 360/137 |

FOREIGN PATENT DOCUMENTS

| | | |
|---|---|---|
| 0477854 | 4/1992 | European Pat. Off. . |
| 3726784 | 2/1989 | Germany . |
| 3202949 | 9/1992 | Germany . |
| 4230912 | 8/1993 | Germany . |
| 4244468 | 7/1994 | Germany . |
| 29605543 | 7/1996 | Germany . |

Primary Examiner—Reinhard J. Eisenzopf
Assistant Examiner—Charles N. Appiah
Attorney, Agent, or Firm—Fulbright & Jaworski, LLP

[57] ABSTRACT

A radio receiver is proposed where a multifunctional 10-digit keypad (1) is provided for the input of information. The radio receiver comprises a receiver component, a display device (75) and keys for the input of information, where the keys are in part configured as a 10-digit keypad (1). In addition, the radio receiver comprises a telephone device. A selection key (5) is provided for switching between telephone operating mode and radio receiver operating mode. An input in the 10-digit keypad (1) during radio operation directly selects the frequency to be tuned in and/or recalls a station key. A frequency input in the 10-digit keypad (1) is preferably indicated by actuating the "0" key (20) of the 10-digit keypad (1) prior to inputting the frequency. An input in the 10-digit keypad (1) in telephone operation mode selects a telephone number. An input in the 10-digit keypad (1) in telephone operation mode can also retrieve a memory location in the speed dial memory. Several alphanumeric and/or special characters are assigned to each of keys (11, 12, ..., 19) of the 10-digit keypad (1) where the desired character is selectable by a single or multiple actuation of the respective key (11, 12, ..., 19). At least one key (10, 45) is provided for the switching of the 10-digit keypad (1) between alphanumeric and numeric input.

58 Claims, 2 Drawing Sheets

RADIO RECEIVER

PRIOR ART

The invention is based on a radio receiver of the kind described in the main claim.

From DE 42 30 912 A1 a radio receiver is known with a receiver component, a display device and keys for the input of information, where the keys are configured in a 10-digit keypad. In addition, the radio receiver also has a memory in which numbers are assigned to the radio stations that can be received. The numbers are in a fixed relation to specific letters of the alphabet with no more than three letters assigned to each number of the 10-digit keypad. Upon selection of a number combination in the radio receiver, the desired station is tuned in according to the input.

ADVANTAGES OF THE INVENTION

In contrast, the radio receiver according to the invention with the features of the main claim, has the advantage that the 10-digit keypad can be used both in the operation of a radio and of a telephone. In this way operating elements are eliminated so that a simpler and easier operation of the receiver is possible. In addition, the reduction of operating elements positively affects production costs.

Moreover, it is advantageous that a more direct input of the desired frequency is possible by means of the 10-digit keypad. In this way it is possible to quickly access a known frequency or one that was just read, such as for example on an advisory highway sign, without having to initiate the "seek" function.

It should also be seen as an additional advantage that in radio reception mode the 10-digit keypad itself can be used multifunctionally and can serve both for the direct selection of the desired frequency and to call up pre-selected stations. Additional operating elements are saved in this way and neatness of layout is improved even more.

The measures listed in the subclaims make possible further advantageous embodiments and improvements of the radio receiver disclosed in the main claim.

Especially advantageous is the use of the 10-digit keypad for selecting memory locations of a speed dialer. In this manner, the functionality of the 10-digit keypad is extended even when used in telephone mode, which again saves operating elements and improves the layout for ease of operation by the user.

Particularly advantageous is the use of the radio receiver display device for displaying the contents of the speed dialer, whereby a memory location is selected by means of a directional key. In this way a multiple use of the indicator device takes place both in radio as well as telephone operation, which also increases ease of operating the unit and reduces the cost of operating elements.

In addition, it should be seen as an advantage that when the radio receiver is equipped with a cassette tape player and a compact disc player or compact disc changer, the 10-digit keypad can be used to operate these components as well. In this case as well, the expanded functionality of the 10-digit keypad produces an improvement of ease of operation and savings of production costs, because separate operating elements need not be provided for each component.

An advantageous improvement of operating comfort also results from the fact that each key of the 10-digit keypad is assigned several alphanumeric and/or special characters, whereby the naming of stations is possible by means of the 10-digit keypad during radio use, of speed dial locations during telephone use and of compact discs during compact disc or compact disc changer use. The input of a message for transmission during telephone unit operation is also possible. Finally, these measures permit a realization of maximal ease of overview, with a minimal use of operating elements and space requirements. This improvement of operating ease allows to minimize the impairment of driving safety during car radio use when the radio receiver is used as a car radio.

THE DRAWING

An exemplary embodiment of the invention is shown in the drawing and is explained in more detail in the following description. There are shown in FIG. 1, an operating unit of the radio receiver according to the invention, in FIG. 2 an expanded 10-digit keypad and in FIG. 3 the breakdown of a speed dial memory in a memory chip of a telephone card and in a memory of a radio receiver.

DESCRIPTION OF THE EXEMPLARY EMBODIMENT

The radio receiver according to the invention is configured here as a car radio. The functions of the radio receiver can be activated by a key combination in an operating unit 70 according to FIG. 1. A display device 75 providing user information and operating instructions is linked with the operating unit 70. In addition, the car radio includes a telephone device, a radio receiver part, a cassette tape drive, a compact disc player configured as a compact disc changer, and a memory which stores speed dial locations for telephone use and memory locations for radio station keys, radio station names and names for compact discs. In addition, the memory 85 contains additional information for the operation of the radio receiver, such as for example sound and volume settings and access authorization codes for one or more users. The operating unit 70 and display device 75 are located together in the operating console 120.

Figure 1:
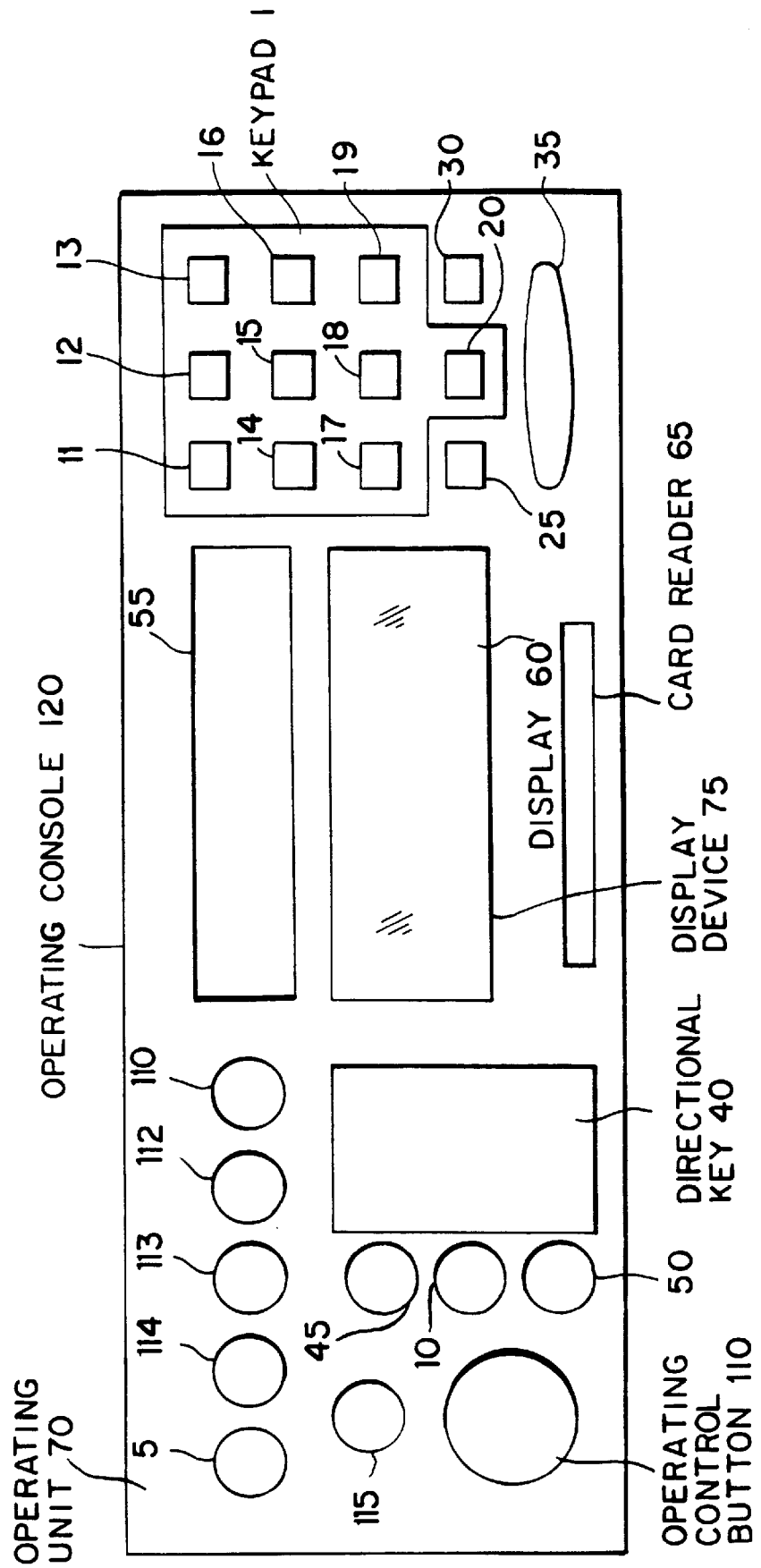
Figure 2:
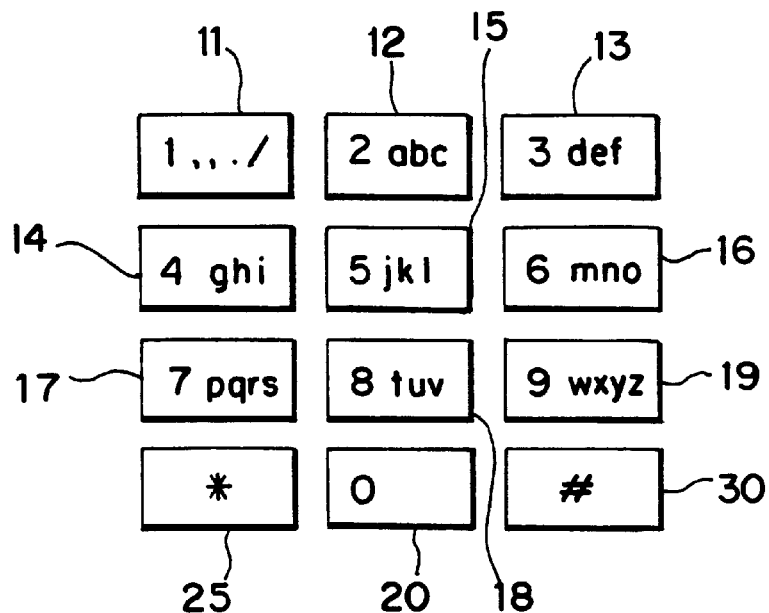

FIG. 1 shows the operating console 120 of the radio receiver, wherein 1 designates a 10-digit keypad having 10 numeric keys 11, 12, . . . , 20. FIG. 2 shows the assignment of the individual keys. Accordingly, reference No. 11 refers to the first key of the 10-digit keypad 1 for entering a "1," reference No. 12 to the second key of the 10-digit keypad 1 for entering a "2," reference No. 13 to the third key of the 10-digit keypad 1 for entering a "3," reference No. 14 to the fourth key of the 10-digit keypad 1 for entering a "4," reference No. 15 to the fifth key of the 10-digit keypad 1 for entering a "5," reference No. 16 to the sixth key of the 10-digit keypad 1 for entering a "6," reference No. 17 to the seventh key of the 10-digit keypad 1 for entering a "7," reference No. 18 to the eighth key of the 10-digit keypad 1 for entering an "8," reference No. 19 to the ninth key of the 10-digit keypad 1 for entering a "9," reference No. 20 to the tenth key of the 10-digit keypad 1 for entering a "0." Additionally, the first nine keys 11, 12, . . . , 19 of the 10-digit keypad have also assigned to them alphanumeric and special characters. Thus, the first key 11 of the 10-digit keypad 1 has assigned to it a comma, a semicolon, a period and a slash. The second key 12 of the 10-digit keypad 1 has assigned to it the letters a, b and c, the third key 13 of the 10-digit keypad 1 has assigned to it the letters d, e and f, the fourth key 14 of the 10-digit keypad 1 has assigned to it the letters g, h and i, the fifth key 15 of the 10-digit keypad 1 has assigned to it the letters j, k and l, the sixth key 16 of the 10-digit keypad 1 has assigned to it the letters m, n and o, the seventh key 17 of the 10-digit keypad 1 has assigned to it the letters p, q, r and s, the eighth key 18 of the 10-digit keypad 1 has assigned to it the letters t, u and v, and the ninth key 19 of the 10-digit keypad 1 has assigned to it the letters w, x, y and z. In addition, two non-numeric auxiliary keys 25 and 30 are arranged in the 10-digit keypad 1, of which the first non-numeric auxiliary key 25 is the "star" key and the second non-numeric auxiliary key 30 is the "pound" key as they are known from telephone keypads. Both non-numeric auxiliary keys 25 and 30 are also shown in FIG. 2.

Pressing the call key 35 in FIG. 1 activates the automatic dialing of a telephone number stored in one of the selected memory locations of the speed dialer memory. Reference 55 designates the cassette slot of a cassette tape player, reference 60 designates a display of the display device 75 which, together with operating unit 70, forms the operating console 120. Reference 65 designates a card reader for the input of an access authorization and/or a telephone card. Reference 110 designates the volume control button of the radio receiver, which button also operates the on/off function. Reference 115 designates a sound adjustment key, 114 a traffic report station key, 113 a the automatic station search key, 112 a noise suppression key and 111 a cassette forward and reverse function key. A menu key 45 lets the selection menu be displayed in the display 60. In addition, a memory key 10 is provided through which memory locations in the memory can be retrieved and displayed in the display 60 by the display device 75. A directional key 40 serves for the selection of menu items or memory locations in the display 60 by allowing a cursor movement up, down, left and right in the display 60. In addition the key 40 is designed as a tilt switch with a vertical and a horizontal tilt axis. A "cancel" key 50 permits cancellation of entries in the display 60. A "select" key 5 permits switching between the telephone device, the radio receiver device, the cassette tape player and the compact disc player.

Below are described in more detail the possible inputs in the operating console 120 shown in FIG. 1. Having switched to the radio receiver operation mode by using the "select" key 5, the keys 11, 12, . . . , 20 of the 10-digit keypad can be used as station keys so that use of at least one of these keys results in selection of the corresponding memory location in the memory so that subsequently the station stored there in form of frequency information can be tuned by the radio receiver. However, a direct selection of a desired frequency is also possible by using the 10-digit keypad 1 so that the selected frequency can be tuned in by the radio receiver without a preceding memory search. A "0" is to be selected to differentiate between an input of station keys and the frequency selection before selecting a frequency by using the tenth key 20 of the 10-digit keypad 1. That means of course, that the tenth key 20 of the 10-digit keypad 1 can only be used as a station key in connection with a preceding selection of another key 11, 12, . . . , 19 of the 10-digit keypad 1.

Having switched from the radio receiver to the telephone function by using key 5, the 10-digit keypad 1 and the non-numeric auxiliary keys 25 and 30 allocated to it, as well as the "call" key 35, can be used as a common telephone keypad for the selection of, for example, a telephone number. Moreover, there is the possibility to retrieve a memory location of a speed dialer by an input in the 10-digit keypad 1. In this context, the speed dialer is either located completely within the memory or both in the memory and in the memory chip of a telephone card inserted into the card reader 65. It would be possible to locate the speed dialer completely in the memory chip of a telephone card inserted into the card reader 65 so that no speed dialer would be needed in the memory. In the example described here, the speed dialer is to be located both in the memory and in the memory chip of a telephone card inserted into the card reader 65. Several possibilities are provided for retrieval of a memory location of the speed dialer. For one, there is the possibility of speed dialing. When speed dialing, nine different memory locations can be retrieved from the memory, as well as nine different locations from the memory chip of a telephone card inserted into the card reader 65. Therefore, only one key of the 10-digit keypad 1 needs to be actuated. To specify the retrieval of a memory location in the speed dial memory by means of speed selection, the appropriate key must be actuated for a first predetermined length of time, for example for more than two seconds. Upon actuation of the appropriate key in the 10-digit keypad 1, an automatic selection of the telephone number stored in the selected memory location takes place. If the speed selection of a memory location is to take place in the speed dialer of a memory chip in a telephone card inserted into the card reader 65, then before the actuation of the appropriate key in the 10-digit keypad 1 the first non-numeric auxiliary key 25 needs to be actuated. Subsequently, the appropriate key of the 10-digit keypad 1 is again actuated for a first predetermined length of time. Once the appropriate key of the 10-digit keypad 1 has been actuated, the telephone number stored in the selected location of the memory chip in the telephone card is automatically dialed. Due to the definition of speed selection for speed dial memory location in the memory chip of the telephone card by the preceding actuation of the first non-numeric auxiliary key 25, the provision can be made not to provide the time delay for the operation of the appropriate key in the 10-digit keypad 1. Instead of the first non-numeric auxiliary key 25, it can also be provided of course that the second non-numeric auxiliary key 30 be used for initiating the described speed dialing.

Figure 3:
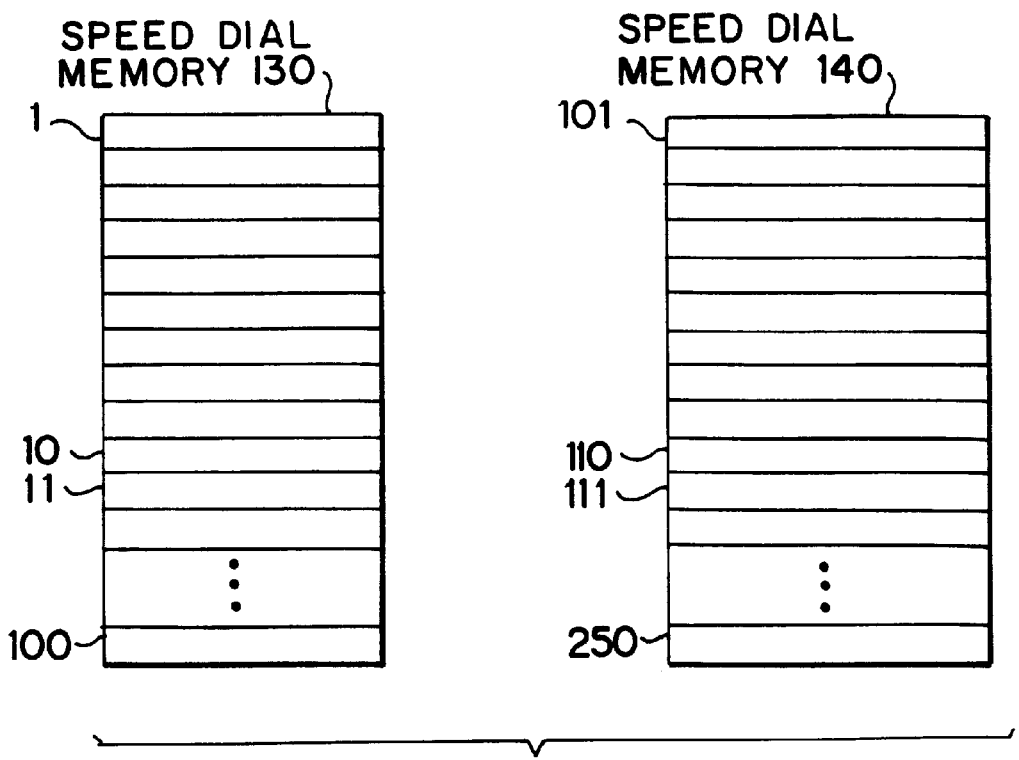

The embodiment described here permits a selection of a total of 250 speed dial locations by taking into account the speed dial location included in the memory chip of the telephone card inserted in the card reader 65. Memory locations 1 through 100 are stored in the speed dial memory 130 of the telephone card according to FIG. 3. Memory locations 101 through 250 are stored in the speed dial memory 140 of the memory which can also be seen in FIG. 3. Thus speed selection allows access to memory locations 1 through 9 of the speed dial memory 130 in the telephone card and the speed dial locations 101 through 109 of the speed dial memory 140 in the memory. Memory locations 10 through 100 of the telephone card memory speed dial memory 130 and the memory locations 110 through 250 of the speed dial memory 140 in the memory are not accessible by speed selection but require for an activation the actuating of the memory key 10, which displays the content of both speed dial memories 130 and 140 in the display 60 of the display device 75. A selection of a memory locations is then effected by actuating the directional key 40, which allows the cursor to run through both speed dial memories, starting from a low-numbered memory location, to a high one and vice versa. An alphabetic run through the speed dial memories 130 and 140 is possible as well. A selection of a memory location can take place by selecting the number of the memory location in the 10-digit keypad 1. At such a selection the cursor jumps to the number of the selected memory location. Since not all memory location numbers and their respective memory location contents can be displayed simultaneously in the display 60 of the display device 75, only the section within the area of the cursor is displayed. If the "call" key 35 is actuated, the telephone number stored in the selected memory location and marked by the cursor, is automatically selected.

"Select" key 5 also serves for the selection of the cassette player and the compact disc changer. Repeated actuation of the "select" key 5 permits switching between the desired operating mode or the desired component. When the cassette player is in use, an input in the 10-digit keypad 1 results in a direct title selection in a cassette inserted in the player. An activation of the desired title occurs once a second predetermined time period has elapsed from the time of input in the 10-digit keypad 1. That means that in case of two-digit or multiple-digit inputs in the 10-digit keypad 1 the time period between the inputs of two consecutive numbers must be shorter than the second predetermined time period. In order to avoid this, another demarkation of two-digit or multiple digit numbers is also possible. For example, a two-digit or a multiple-digit input can be initiated and terminated by actuating the two non-numeric auxiliary keys 25 and 30, so that the activation of the selected title does not take place until after the second actuation of the appropriate non-numeric auxiliary key 25, 30.

During the compact disc player or compact disc changer operation a direct title selection is possible in the same manner as during the cassette tape player operation. If the compact disc player is configured as a compact disc changer as described in the exemplary embodiment, a direct selection of a disc located in the compact disc changer can be executed by means of an input in the 10-digit keypad 1. Common compact disc changers allow a selection of ten different compact discs, so that a simple input is sufficient to select the desired compact disc. The identification of a compact disc selection requires that the appropriate key of the 10-digit keypad 1 be actuated for a third predetermined length of time, for example for 1 second. If more than ten compact discs are stored and are accessible in the compact disc changer, it is again possible to use the described solution for the purpose of title selection through the use of one of the two non-numeric keys 25 and 30 in the 10-digit keypad 1. For example, to differentiate between two-digit or multiple-digit title selections or two-digit or multiple-digit compact disc selections, different non-numeric auxiliary keys can be used, i.e., the first non-numeric auxiliary key 25 for the title selection and the second non-numeric auxiliary key 30 for the compact disc selection; or, by actuating the same non-numeric auxiliary key 25, 30 for at least a fourth predetermined length of time after the input of the two-digit or multiple-digit number, for the selection of a compact disc.

As described previously, each of the keys of the 10-digit keypad 1 has assigned to it several alphanumeric and special characters. If, during radio receiver operation, the menu key 45 is actuated, the 10-digit keypad 1 switches to alphanumeric input. In this way it is possible to give a name to the radio station currently being received. This name will then appear in the display 60 every time that station is retrieved. Naming of the station takes place through sequential input of alphanumeric and/or special characters, whereby the alphanumeric and/or special characters are inputted as follows: when actuating the keys 12, 13, 14, 15, 16 and 18 of the 10-digit keypad 1, each of which have assigned to them three letters, the first actuation of the key selects the first letter, the second actuation the second letter, the third actuation the third letter and the fourth actuation the number of the corresponding key. Additional actuation of the appropriate key periodically repeats the sequence of characters. Activation of the characters on keys 11, 17 and 19 of the 10-digit keypad 1, which have assigned to them four letters and/or special characters, takes place correspondingly whereby the sequence consists of five instead of four characters.

If the menu key 45 is actuated during compact disc player or compact disc changer operation, then the 10-digit keypad 1 is likewise switched to the alphanumeric input and the disc being played can be named in any desired fashion. This name will then appear in the display 60 every time the disc is played. The naming occurs by sequentially inputting letters according to the above description of the naming of radio stations. Another actuation of the menu key 45 completes the naming of the station or the compact disc and the 10-digit keypad 1 is again switched to the numeric input. In a further embodiment example, an actuation of the menu key 45 causes the display 60 to display a menu interface with a "Radio Station Name" option or a "Compact Disc Name" option. The desired option can be selected by using the directional key 40 and another actuation of the menu key 45. This results in a switching to the desired operating mode without having to actuate the "select" key 5. When the naming process is complete and the menu key 45 is subsequently actuated, the function first switches to the next menu level with the two menu options, which can then be closed by actuating the "cancel" key 50. Simultaneously with the actuation of the "cancel" key 50 the 10-digit keypad 1 switches to the numeric input mode.

An additional functionality of the "store" key 10 is provided for the naming of speed dial locations. Thus, if the "store" key 10 is actuated during telephone operation, a selection menu appears first in the display 60. It contains the option of displaying the speed dial memory alphabetically or in numeric order, the option to transmit brief messages through the telephone device, and the option to create new speed dial locations and optionally at the same time to overwrite existing speed dial locations. The selection of the first two described options occurs by means of the directional key 40 and/or by means of numeric input in the 10-digit keypad 1, as previously described. The options are selected by means of the directional key 40 and activated by means of another actuation of the "store" key 10. If the "create new speed dial location" option is selected, then by activating this option through actuation of the "store" key 10 the 10-digit keypad 1 is simultaneously switched to alphanumeric input. The desired memory location is then selected by means of the directional key 40 and is overwritten by the speed dial choice; the speed dial choice can contain both the telephone number and the name of the person associated with that telephone number. Actuation of the "store" key 10 then stores the altered memory location in the memory and the quits the menu option. Simultaneously, the 10-digit keypad 1 is again switched to numeric input. Display 60 again displays the next menu level with the four abovementioned options, which can be canceled by actuating the "cancel" key 50. If the third option is selected, i.e., for the input of messages to be transmitted in telephone operation and the "store" key 10 is actuated, the 10-digit keypad 1 also switches to alphanumeric input. Appropriate input of alphanumeric and/or special characters in the 10-digit keypad 1 lets a message to be composed. That message will then be displayed in display 60 of the display device 75 in the same manner as when naming radio stations, compact discs or speed dial locations. Deletion of alphanumeric and/or special characters is possible in all described instances by marking the entry to be deleted using the directional key 40 and deleting the entry by actuating the "delete" key 50. In all described instances the alphanumeric input of letters and/or special characters takes place by a single or multiple actuation of the appropriate key in the 10-digit keypad 1, as described in the section regarding the naming of radio stations. The "store" key 10 is actuated after a message to be transmitted is inputted in the display 60. This switches the 10-digit keypad 1 back to numeric input. Simultaneously, the message is stored in the memory. The menu can then be quitted in the manner described above in reference to the naming of speed dial memory location. If a telephone number is thereupon entered in the 10-digit keypad 1, the message stored in the memory is sent via the telephone device to the party whose number was dialed. Whenever a new message is entered, the old message stored in the memory is overwritten by the current message.

What is claimed is:

1. Radio broadcast receiver comprising a broadcast receiving part and keys for the entry of information, the keys being configured partially as a 10-key keyboard, a telephone system and a selector key for switching between telephone operation and broadcast receiving operation, wherein by an entry at the 10-key keyboard in broadcast receiving operation a direct entry of at least one of the groups comprising the frequency to be received or a call of station keys is performed, wherein the distinction of a frequency input at the ten-key keyboard is performed by an entry at the 10-key keyboard in telephone operation and a call of the memory location of a speed-dialing memory is performed, wherein for a given number of memory locations of the speed-dialing memory, a characterization of the call of at least one of these memory locations is performed by operating precisely one key of the 10-key keyboard at least for a first given time, wherein after operation of this key, an automatic dialing of the telephone number stored in the selected memory location is made and for the remaining memory locations of the speed-dialing memory a characterization of the call of one of these memory locations is performed by operating at least two keys.

2. Radio broadcast receiver according to claim 1, having at least one non-numerical auxiliary key which is associated with the 10-key keyboard, wherein a characterization of the call of at least one of the remaining memory locations of the speed dialing memory is performed by operating first the non-numerical auxiliary key and then operating one key of the 10-key keyboard for at least the first given time, such that after operation of the key of the 10-key keyboard an automatic selection of the call number stored in the chosen memory location takes place.

3. Radio broadcast receiver according to claim 2, whereby a memory key is provided such that by operation thereof the content of the speed dialing memory can be displayed on a display device of the radio broadcast receiver, wherein the selection of a memory location is performed by subsequent operation of at least one from the group comprising a direction key or an entry at the 10-key keyboard and a call key is provided, such that after operation of the call key an automatic selection of the telephone number stored in the selected memory location is performed.

4. Radio broadcast receiver according to claim 3 whereby a direct entry of the frequency to be received is made by an entry at the 10-key keyboard in radio broadcast receiving operation.

5. Radio broadcast receiver according to claim 4, wherein entry of a telephone number is performed by an entry at the 10-key keyboard in telephony operation.

6. Radio broadcast receiver according to claim 4, wherein the radio broadcast receiver comprises a cassette driving mechanism such that a changeover between cassette operation and other functions of the radio broadcast receiver is performed by the selector key and wherein by an entry in the 10-key keyboard in cassette operation, a direct title selection for a cassette situated in the cassette driving mechanism is performed.

7. Radio broadcast receiver according to claim 4, wherein the radio broadcast receiver comprises a compact disk player such that a changeover between compact disk operation and other functions of the radio broadcast receiver is performed by the selector key and wherein by an entry at the ten-key keyboard in compact disk operation, a direct title selection for a compact disk situated in the compact disk mechanism is performed.

8. Radio broadcast receiver according to claim 4, wherein the radio broadcast receiver is connected with a compact disk changer, a changeover between compact disk changer operation and other functions of the radio broadcast receiver is performed by the selector key, that by an entry at the 10-key keyboard in compact disk operation, at least one selection from the group comprising a direct selection of a compact disk situated in the compact disk changer or a direct title selection for a compact disk situated in the compact disk mechanism are performed, and wherein a characterization of the selection of a compact disk is performed by operating the corresponding key of the 10-key keyboard at least for an additional present time.

9. Radio broadcast receiver according to claim 4, wherein the keys of the 10-key keyboard there are associated with at least one of the following steps from the group comprising a plurality of alphanumerical signs or special signs, the desired sign being selectable by single or multiple operation of the corresponding key, and wherein at least one key is provided for switching the 10-key keyboard between alphanumerical entry and numerical entry.

10. Radio broadcast receiver according to claim 4, wherein by entry of alphanumerical signs at the 10-key keyboard in radio broadcast receiving operation a naming of at least one transmitter is performed.

11. Radio broadcast receiver according to claim 4, wherein by entry of alphanumerical signs at the 10-key keyboard in telephone operation, a naming of at least one speed-dialing memory location is performed.

12. Radio broadcast receiver according to claim 2 whereby a direct entry of the frequency to be received is made by an entry at the 10-key keyboard in radio broadcast receiving operation.

13. Radio broadcast receiver according to claim 12, wherein entry of a telephone number is performed by an entry at the 10-key keyboard in telephony operation.

14. Radio broadcast receiver according to claim 12, wherein the radio broadcast receiver comprises a cassette driving mechanism such that a changeover between cassette operation and other functions of the radio broadcast receiver is performed by the selector key and wherein by an entry in the 10-key keyboard in cassette operation, a direct title selection for a cassette situated in the cassette driving mechanism is performed.

15. Radio broadcast receiver according to claim 12, wherein the radio broadcast receiver comprises a compact disk player such that a changeover between compact disk operation and other functions of the radio broadcast receiver is performed by the selector key and wherein by entry at the ten-key keyboard in compact disk operation, a direct title selection for a compact disk situated in the compact disk mechanism is performed.

16. Radio broadcast receiver according to claim 12, wherein the radio broadcast receiver is connected with a compact disk changer, a changeover between compact disk changer operation and other functions of the radio broadcast receiver is performed by the selector key, that by an entry at the 10-key keyboard in compact disk operation, at least one selection from the group comprising a direct selection of a compact disk situated in the compact disk changer or a direct title selection for a compact disk situated in the compact disk mechanism are performed, and wherein a characterization of the selection of a compact disk is performed by operating the corresponding key of the 10-key keyboard at least for an additional present time.

17. Radio broadcast receiver according to claim 12, wherein the keys of the 10-key keyboard there are associated with at least one of the following steps from the group comprising a plurality of alphanumerical signs or special signs, the desired sign being selectable by single or multiple operation of the corresponding key and wherein at least one key is provided for switching the 10-key keyboard between alphanumerical entry and numerical entry.

18. Radio broadcast receiver according to claim 12, wherein by entry of alphanumerical signs at the 10-key keyboard in radio broadcast receiving operation a naming of at least one transmitter is performed.

19. Radio broadcast receiver according to claim 12, wherein by entry of alphanumerical signs at the 10-key keyboard in telephone operation, a naming of at least one speed-dialing memory location is performed.

20. Radio broadcast receiver according to claim 12, whereby the distinction of a frequency input at the 10-key keyboard is performed by operating the zero key of the 10-key keyboard before entering the frequency.

21. Radio broadcast receiver according to claim 1, whereby a memory key is provided such that by operation thereof the content of the speed dialing memory can be displayed on a display device of the radio broadcast receiver, wherein the selection of a memory location is performed by subsequent operation of at least one from the group comprising a direction key or an entry at the 10-key keyboard and a call key is provided, such that after operation of the call key an automatic selection of the telephone number stored in the selected memory location is performed.

22. Radio broadcast receiver according to claim 21 whereby a direct entry of the frequency to be received is made by an entry at the 10-key keyboard in radio broadcast receiving operation.

23. Radio broadcast receiver according to claim 22, wherein entry of a telephone number is performed by an entry at the 10-key keyboard in telephony operation.

24. Radio broadcast receiver according to claim 22, wherein the radio broadcast receiver comprises a cassette driving mechanism such that a changeover between cassette operation and other functions of the radio broadcast receiver is performed by the selector key and wherein by an entry in the 10-key keyboard in cassette operation, a direct title selection for a cassette situated in the cassette driving mechanism is performed.

25. Radio broadcast receiver according to claim 22, wherein the radio broadcast receiver is connected with a compact disk changer, a changeover between compact disk changer operation and other functions of the radio broadcast receiver is performed by the selector key, that by an entry at the 10-key keyboard in compact disk operation, at least one selection from the group comprising a direct selection of a compact disk situated in the compact disk changer or a direct title selection for a compact disk situated in the compact disk mechanism are performed, and wherein a characterization of the selection of a compact disk is performed by operating the corresponding key of the 10-key keyboard at least for an additional present time.

26. Radio broadcast receiver according to claim 22, wherein the keys of the 10-key keyboard there are associated with at least one of the following steps from the group comprising a plurality of alphanumerical signs or special signs, the desired sign being selectable by single or multiple operation of the corresponding key and wherein at least one key is provided for switching the 10-key keyboard between alphanumerical entry and numerical entry.

27. Radio broadcast receiver according to claim 22, wherein by entry of alphanumerical signs at the 10-key keyboard in radio broadcast receiving operation a naming of at least one transmitter is performed.

28. Radio broadcast receiver according to claim 22, wherein by entry of alphanumerical signs at the 10-key keyboard in telephone operation, a naming of at least one speed-dialing memory location is performed.

29. Radio broadcast receiver according to claim 22, whereby the distinction of a frequency input at the 10-key keyboard is performed by operating the zero key of the 10-key keyboard before entering the frequency.

30. Radio broadcast receiver according to claim 22, wherein the radio broadcast receiver comprises a cassette driving mechanism such that a changeover between cassette operation and other functions of the radio broadcast receiver is performed by the selector key and wherein by an entry in the 10-key keyboard in cassette operation, a direct title selection for a cassette situated in the cassette driving mechanism is performed.

31. Radio broadcast receiver according to claim 22, wherein the radio broadcast receiver comprises a compact disk player such that a changeover between compact disk operation and other functions of the radio broadcast receiver is performed by the selector key and wherein by an entry at the ten-key keyboard in compact disk operation, a direct title selection for a compact disk situated in the compact disk mechanism is performed.

32. Radio broadcast receiver according to claim 1, whereby a direct entry of the frequency to be received is made by an entry at the 10-key keyboard in radio broadcast receiving operation.

33. Radio broadcast receiver according to claim 32, whereby a characterization of a frequency input at the 10-key keyboard is performed by operating the zero key on the 10-key keyboard before entering the frequency.

34. Radio broadcast receiver according to claim 32, wherein entry of a telephone number is performed by an entry at the 10-key keyboard in telephony operation.

35. Radio broadcast receiver according to claim 32, wherein the radio broadcast receiver comprises a cassette driving mechanism such that a changeover between cassette operation and other functions of the radio broadcast receiver is performed by the selector key and wherein by an entry in the 10-key keyboard in cassette operation, a direct title selection for a cassette situated in the cassette driving mechanism is performed.

36. Radio broadcast receiver according to claim 32, wherein the radio broadcast receiver comprises a compact disk player such that a changeover between compact disk operation and other functions of the radio broadcast receiver is performed by the selector key and wherein by an entry at the ten-key keyboard in compact disk operation, a direct title selection for a compact disk situated in the compact disk mechanism is performed.

37. Radio broadcast receiver according to claim 32, wherein the radio broadcast receiver is connected with a compact disk changer such that a changeover between compact disk changer operation and other functions of the radio broadcast receiver is performed by the selector key, wherein by an entry at the 10-key keyboard in compact disk operation, at least one selection from the group comprising a direct selection of a compact disk situated in the compact disk changer or a direct title selection for a compact disk situated in the compact disk mechanism are performed, and wherein a characterization of the selection of a compact disk is performed by operating the corresponding key of the 10-key keyboard at least for an additional present time.

38. Radio broadcast receiver according to claim 32, wherein the keys of the 10-key keyboard there are associated with at least one of the following steps from the group comprising a plurality of alphanumerical signs or special signs, the desired sign being selectable by single or multiple operation of the corresponding key, and wherein at least one key is provided for switching the 10-key keyboard between alphanumerical entry and numerical entry.

39. Radio broadcast receiver according to claim 32, wherein by entry of alphanumerical signs at the 10-key keyboard in radio broadcast receiving operation a naming of at least one transmitter is performed.

40. Radio broadcast receiver according to claim 32, wherein by entry of alphanumerical signs at the 10-key keyboard in telephone operation, a naming of at least one speed-dialing memory location is performed.

41. Radio broadcast receiver according to claim 32, whereby the distinction of a frequency input at the 10-key keyboard is performed by operating the zero key of the 10-key keyboard before entering the frequency.

42. Radio broadcast receiver according to claim 1, wherein entry of a telephone number is performed by an entry at the 10-key keyboard in telephony operation.

43. Radio broadcast receiver according to claim 42, whereby the distinction of a frequency input at the 10-key keyboard is performed by operating the zero key of the 10-key keyboard before entering the frequency.

44. Radio broadcast receiver according to claim 1, wherein the radio broadcast receiver comprises a cassette driving mechanism, wherein a changeover between cassette operation and other functions of the radio broadcast receiver is performed by the selector key and wherein by an entry in the 10-key keyboard in cassette operation, a direct title selection for a cassette situated in the cassette driving mechanism is performed.

45. Radio broadcast receiver according to claim 1, wherein the radio broadcast receiver comprises a compact disk player, wherein a changeover between compact disk operation and other functions of the radio broadcast receiver is performed by the selector key and wherein by an entry at the ten-key keyboard in compact disk operation, a direct title selection for a compact disk situated in the compact disk mechanism is performed.

46. Radio broadcast receiver according to claim 45, whereby an entry of alphanumerical signs at one of the locations chosen from the group comprising the 10-key keyboard in compact disk operation or in compact disk changer operation, a naming of at least one compact disk is performed.

47. Radio broadcast receiver according to 46, wherein by entry of alphanumerical signs at the 10-key keyboard in telephony operation, the setting up of a message is performed which can be transmitted by subsequent changeover of the 10-key keyboard to numerical entry and by entering a telephone number.

48. Radio broadcast receiver according to claim 1, wherein the radio broadcast receiver is connected with a compact disk changer, wherein a changeover between compact disk changer operation and other functions of the radio broadcast receiver is performed by the selector key, wherein by entry at the 10-key keyboard in compact disk operation, at least one selection from the group comprising a direct selection of a compact disk situated in the compact disk changer or a direct title selection for a compact disk situated in the compact disk mechanism are performed, and wherein a characterization of the selection of a compact disk is performed by operating the corresponding key of the 10-key keyboard at least for an additional present time.

49. Radio broadcast receiver according to claim 48, wherein by entry of alphanumerical signs at one of the locations chosen from the group comprising the 10-key keyboard in compact disk operation or in compact disk changer operation, a naming of at least one compact disk is performed.

50. Radio broadcast receiver according to claim 1, wherein the keys of the 10-key keyboard there are associated with at least one of the following steps selected from the group comprising a plurality of alphanumerical signs or special signs, the desired sign being selectable by single or multiple operation of the corresponding key and wherein at least one key is provided for switching the 10-key keyboard between alphanumerical entry and numerical entry.

51. Radio broadcast receiver according to claim 50, wherein by entry of alphanumerical signs at the 10-key keyboard in telephone operation, a naming of at least one speed-dialing memory location is performed.

52. Radio broadcast receiver according to claim 51, wherein by entry of alphanumerical signs at one of the locations chosen from the group comprising the 10-key keyboard in compact disk operation or in compact disk changer operation, a naming of at least one compact disk is performed.

53. Radio broadcast receiver according to claim 50, wherein by entry of alphanumerical signs at the 10-key keyboard in telephony operation, the setting up of a message is performed which can be transmitted by subsequent changeover of the 10-key keyboard to numerical entry and by entering a telephone number.

54. Radio broadcast receiver according to claim 50, wherein by entry of alphanumerical signs at one of the locations chosen from the group comprising the 10-key keyboard in compact disk operation or in compact disk changer operation, a naming of at least one compact disk is performed.

55. Radio broadcast receiver according to claim 50, whereby an entry of alphanumerical signs at the 10-key keyboard in radio broadcast receiving operation a naming of at least one transmitter is performed.

56. Radio broadcast receiver according to claim 55, wherein by entry of alphanumerical signs at the 10-key keyboard in telephone operation, a naming of at least one speed-dialing memory location is performed.

57. Radio broadcast receiver according to claim 55, wherein by entry of alphanumerical signs at one of the locations chosen from the group comprising the 10-key keyboard in compact disk operation or in compact disk changer operation, a naming of at least one compact disk is performed.

58. Radio broadcast receiver according to claim 1, wherein the broadcast receiver is an auto radio.

* * * * *

UNITED STATES PATENT AND TRADEMARK OFFICE
CERTIFICATE OF CORRECTION

PATENT NO.    : 6,160,997
DATED         : December 12, 2000
INVENTOR(S)   : Ralf Oberlaender It is certified that error appears in the above-identified patent and that said Letters Patent is hereby corrected as shown below:

Column 7, claim 6,
Line 67, change "such that" to -- wherein --.

Column 8, claim 7,
Line 8, change "such that" to -- wherein --.

Column 8, claim 8,
Line 16, change "changer" to -- wherein --.
Line 18, delete -- that --.
Line 18, delete -- an --.
Line 18, before "by" insert -- wherein --.

Column 8, claim 9,
Line 29, after "steps" insert -- selected --.

Column 9, claim 16,
Line 1, after "changer" insert -- such that --.

Column 9, claim 25,
Line 59, after "changer" insert -- such that --.

Column 11, claim 37,
Line 1, delete -- such that --.

Column 12, claim 48,
Line 1, delete -- wherein --.

Signed and Sealed this

Twenty-third Day of October, 2001

*Attest:*

NICHOLAS P. GODICI
*Attesting Officer*    *Acting Director of the United States Patent and Trademark Office*